US011780322B2

(12) United States Patent
Dudar et al.

(10) Patent No.: US 11,780,322 B2
(45) Date of Patent: *Oct. 10, 2023

(54) FUEL SYSTEM FOR A VEHICLE

(71) Applicant: Ford Global Technologies, LLC, Dearborn, MI (US)

(72) Inventors: Aed M. Dudar, Canton, MI (US); Dennis Seung-Man Yang, Canton, MI (US); Kenneth L. Pifher, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/560,603

(22) Filed: Dec. 23, 2021

(65) Prior Publication Data

US 2023/0202291 A1 Jun. 29, 2023

(51) Int. Cl.
*B60K 15/03* (2006.01)
*B60K 15/035* (2006.01)
*F02M 25/08* (2006.01)

(52) U.S. Cl.
CPC .. *B60K 15/03504* (2013.01); *B60K 15/03519* (2013.01); *F02M 25/089* (2013.01); *F02M 25/0836* (2013.01); *B60K 2015/0359* (2013.01); *B60K 2015/03217* (2013.01); *B60K 2015/03236* (2013.01); *B60K 2015/03547* (2013.01)

(58) Field of Classification Search
CPC ........ B60K 15/03504; B60K 15/03519; B60K 2015/03217; B60K 2015/03236; B60K 2015/03547; B60K 2015/0359; F02M 25/0836; F02M 25/089
See application file for complete search history.

(56) References Cited

U.S. PATENT DOCUMENTS

| 5,564,398 | A | * | 10/1996 | Maeda | F02M 25/0854 123/519 |
| 9,611,814 | B2 | * | 4/2017 | Dudar | F02M 25/089 |
| 10,047,705 | B2 | * | 8/2018 | Dudar | F02M 25/0854 |
| 2013/0312713 | A1 | * | 11/2013 | McLain | F02M 25/0818 123/518 |
| 2017/0226966 | A1 | * | 8/2017 | Koga | B01D 46/0036 |

* cited by examiner

*Primary Examiner* — Xiao En Mo
(74) *Attorney, Agent, or Firm* — Brooks Kushman P.C.; Vincent Mastrogiacomo

(57) ABSTRACT

A fuel system, a vehicle, and a method of controlling an evaporative emissions system for the vehicle are provided. The fuel system has a fuel tank having a fuel fill port with a closure member. An evaporative emissions canister has a first port fluidly coupled to the fuel tank to receive vapor therefrom and a second port, with the canister positioned between an air intake for an engine and a vent to atmosphere. A filter or a second canister is supported by a bracket for movement between first and second positions, with the filter fluidly coupling the second port of the canister to the vent in the first position, and the filter spaced apart from and decoupled from the second port of the canister in the second position. The second port of the canister is in direct fluid communication with atmosphere when the filter is in the second position.

20 Claims, 5 Drawing Sheets

US 11,780,322 B2

FUEL SYSTEM FOR A VEHICLE

TECHNICAL FIELD

Various embodiments relate to a vehicle with an evaporative emissions system for an engine, and a method of controlling the evaporative emissions system.

BACKGROUND

A vehicle with an engine may be provided with an evaporative emissions system with a canister to absorb fuel vapors from the fuel tank and system. The evaporative emission may be provided with a filter positioned between the canister and a vent to atmosphere, and this filter may be provided as a convention filter for dust or debris, or as a second canister element to absorb fuel vapor and meet certain emissions standards. The filter further restricts air flow between the fuel tank and the vent, such that during a refueling process the fuel tank pressure may increase and cause interruptions to the fueling process, for example, at higher fuel filling rates from a fuel pump or other external fuel source.

SUMMARY

In an embodiment, a fuel system for a vehicle is provided with a fuel tank having a fuel fill port with a closure member. An evaporative emissions canister has a first port fluidly coupled to the fuel tank to receive vapor therefrom and a second port, with the canister positioned between an air intake for an engine and a vent to atmosphere. A filter is supported by a bracket for movement between a first position and a second position. The filter fluidly couples the second port of the canister to the vent in the first position, and the filter is spaced apart from and decoupled from the second port of the canister in the second position. The second port of the canister is in direct fluid communication with atmosphere when the filter is in the second position.

In another embodiment, a vehicle is provided with an engine having an air intake, and a fuel tank with a fuel fill port and a closure member movable between a closed position to cover the fuel fill port and an open position to fuel the fuel tank via the fuel fill port. An evaporative emissions canister has a first port fluidly coupled to the fuel tank to receive vapor therefrom and a second port, with the canister fluidly connecting the air intake to a vent to atmosphere. A filter is supported by a bracket for movement between a first position and a second position. The filter is connected by at least one linkage to the closure member, with the filter fluidly coupling the second port of the canister to the vent in the first position, and the filter spaced apart from and decoupled from the second port of the canister in the second position. The second port of the canister is in direct fluid communication with atmosphere when the filter is in the second position. Movement of the closure member from the closed position to the open position drives the at least one linkage to move the filter from the first position to the second position. Movement of the closure member from the open position to the closed position drives the at least one linkage to move the filter from the second position to the first position.

In yet another embodiment, a method of controlling an evaporative emissions system for a vehicle is provided. A filter is decoupled from a port of an evaporative emissions canister in response to opening a closure member for a fuel fill port of a fuel tank when fueling the fuel tank such that the port is in direct fluid communication with atmosphere. The filter is coupled to the port of the evaporative emissions canister in response to closing the closure member to cover the fuel fill port such that the canister is in fluid communication with atmosphere via the filter.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
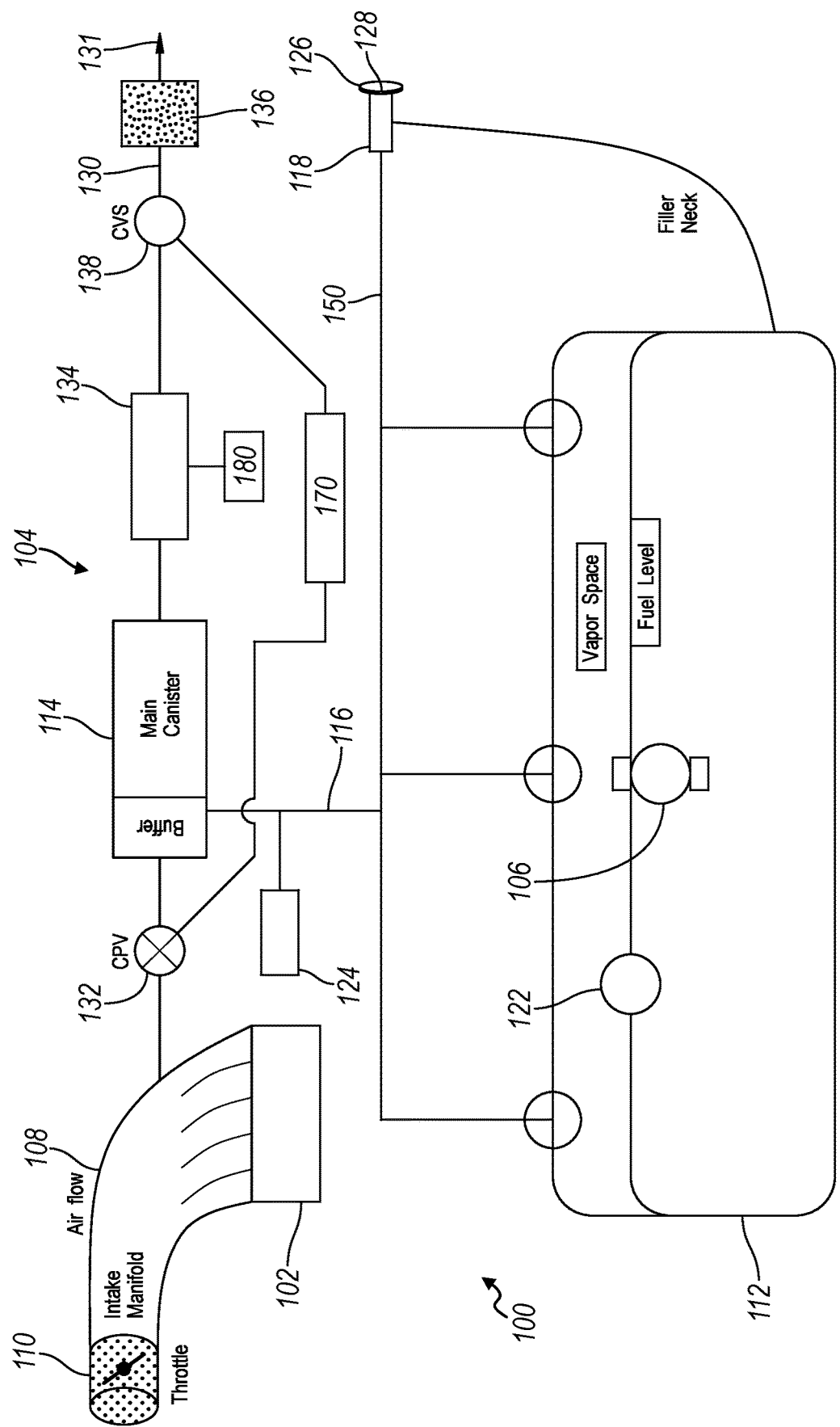
FIG. 1 illustrates a schematic for a vehicle fuel system according to an embodiment.

FIG. 1 illustrates a fuel system 100 for a vehicle. The vehicle may be a conventional vehicle, or may be a hybrid vehicle powered by both an internal combustion engine as well as another propulsion source such as an electric motor. The fuel system 100 delivers fuel to an internal combustion engine 102, and is also provided with an evaporative emissions system 104. The fuel system 100 to the engine has a fuel pump 106 to pressurize fuel to deliver to the engine 102, and may include a fuel injector system according to one example.

The engine 102 has one or more cylinders, an engine intake manifold 108 and an engine exhaust manifold (not shown). The engine intake 108 has a throttle 110 fluidly coupled to the engine intake manifold.

The fuel system 100 has a fuel storage tank 112. The fuel tank 112 is sized to receive a volume of fuel. The fuel tank may be provided by a single tank, or multiple tanks fluidly connected to one another. In various non-limiting examples, the fuel may be a liquid fuel such as gasoline, diesel, alcohol fuels, a mixture thereof, or the like. As used herein, fluid refers to a substance in its liquid phase state, vapor or gas phase state, or a saturated liquid—vapor mixture.

Vapors generated in the fuel system 100 may be directed to an evaporative emissions system 104. The evaporative emission system 104 has a fuel vapor canister 114 fluidly connected to the fuel tank 112 via a vapor recovery line 116 or vent line 116. The fuel vapor canister 114 is fluidly connected to the engine intake manifold 108 to purge vapors in the canister 114 to the engine 102.

The fuel tank 112 in the fuel system 100 may be periodically filled, fueled, refilled or refueled from an external fuel source via a fuel fill inlet 118. The fuel fill inlet 118 has a neck or filler pipe and may be sized to receive a nozzle or other fuel dispensing device of the external fuel source. According to various examples, the external fuel source may be a fuel pump at a gas station, a portable gas can or gas tank, or a mobile refueling system such as a refueling vehicle or truck. The fuel system 100 may be provided with a fuel level sensor 122 to indicate the fuel level in the fuel tank 112 to the vehicle operator, e.g. via a fuel gauge or other indicator in a vehicle instrument panel. The fuel tank 112 may additionally be provided with a fuel tank pressure transducer 124 to sense the pressure within the fuel tank, and the transducer 124 may be positioned in the vent line 116.

The fuel fill inlet 118 may be closed via a closure member 126. The closure member 126 may be a door that moves between a first, closed position to cover the fuel fill inlet 118, and a second, open position to provide access to the inlet 118 for the external fuel source. For a door as the closure member, the door may be rotatably supported relative to the fuel fill port, and movable between a first closed position to cover the fuel fill port and a second open position for fueling the fuel tank via the fuel fill port. In various examples, the closure member 126 may be provided with or without a sealing member. In other examples, the closure member 126 may alternatively or additionally include a fuel fill cap with a sealing member to seal the cap to the fuel tank 112, and prevent fluids, including vapor from exiting the fuel tank 112 via the fuel fill inlet 118 when the cap 126 is closed. Alternatively or additionally, the closure member 126 may include a valve, e.g. in a capless fuel tank. A switch or sensor 128 may be provided to detect the position of the closure member.

The fuel vapor canister 114 of the evaporative emissions system 104 may be filled with an adsorbent material, such as activated carbon, to temporarily trap or retain fuel vapors from the fuel tank 112, e.g. during fueling the fuel tank, vehicle operation, or during diurnal temperature changes causing pressure changes and fuel vaporization when the vehicle is not operating. In one example, the adsorbent material is provided as pellets that are loose packed into the canister 114. The fuel vapor canister 114 may include an atmospheric ventilation line 130 between the canister and a vent 131 to atmosphere for venting vapors from the canister 114 to atmosphere and/or for drawing fresh outside air into the canister 114.

A canister purge valve (CPV) 132 is positioned between the fuel vapor canister 114 and the intake manifold 108 to control the flow of fuel vapor from the canister 114 into the engine 102. The CPV 132 may be opened during a canister 114 purge process, for diagnostics of the evaporative emissions system 104 and/or fuel system 100, and the like.

The evaporative emissions system 104 also has a filter 134. The filter 134 may be provided as a second evaporative emissions canister, and be filled with an adsorbent material, such as activated carbon, to temporarily trap or retain fuel vapors from the fuel tank 112, e.g. during fueling the fuel tank, vehicle operation, or during diurnal temperature changes causing pressure changes and fuel vaporization when the vehicle is not operating. The filter 134 is positioned between the canister 114 and the vent 131. In other examples, the filter 134 may be provided to remove dust and/or debris from atmospheric air drawn into the evaporative emissions system 104, for example, during a purge process. When the filter 134 is a second canister, another filter 136 may additionally be provided as shown in FIG. 1. The another filter 136 may be used as a particulate filter for dust and or debris.

In some examples, the evaporative emissions system 104 is provided with a canister vent valve (CVS) 138 that fluidly connects the filter 134 to the atmospheric vent 131. In other examples, the evaporative emissions system 104 is provided without a CVS 138 such that there is an open flow path between the filter 134 and the atmospheric vent 131, or between filter 136 and the vent 131.

Vehicles may be required to have diagnostics to validate the integrity of the fuel system 100, including the evaporative emissions system 104, for potential leaks, and to purge the canister 114 of the evaporative emissions system 104. Generally, the evaporative emissions system 104 is purged when the engine 102 is operating such that the operating engine combusts the fuel vapors. The CPV 132 is opened during a purge operation to fluidly connect the evaporative emissions system 104 with the air intake 108.

The fuel system 100 may additionally have a recirculation line 150 that provides a passage directly between the fuel filling inlet 118 and the evaporative emissions system 104, and bypasses the fuel tank 112. The vapor recirculation through the recirculation line 150 may reduce air entrainment by fuel flowing into the fuel tank 112 and hence reduce fuel vaporization inside the tank 112. In other examples, the fuel system may be provided without a recirculation line 150.

Various components of the fuel system 100, evaporative emissions system 104, and engine 102 are in communication with a controller 170 or control system. The controller 170 may be provided as one or more controllers or control modules for the various vehicle components and systems. The controller 170 and control system for the vehicle may include any number of controllers, and may be integrated into a single controller, or have various modules. Some or all of the controllers may be connected by a controller area network (CAN) or other system. It is recognized that any controller, circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

The controller 170 may be in communication with other vehicle sensors, such as the fuel tank pressure transducer 124, the fuel lever sensor 122, and the closure member sensor 128.

The evaporative emissions system 104 is used to adsorb fuel vapors such as those resulting from refueling, diurnal and running loss vapors, into the canister 114. A second canister 134 may be provided, for example, to meet a diurnal test, or otherwise meet emissions requirements. According to one example, a diurnal test is a two to three day test that measures vehicle hydrocarbon emissions against a limit while the vehicle is inoperative. In one example, the second canister 134 is also known as a bleed canister, and the vehicle is a practically or partial zero emissions vehicles or PZEV.

The second canister 134, or filter 134, adds a restriction to the flow path between the canister 114 and the atmospheric vent 131. The second canister 134 may therefore reduce a flow rate across the canister 134 for flow in either direction through the canister 134, and also may increase a back pressure in the main canister and upstream of the second canister 134 when vapor is flowing from the main canister 114 towards the vent 131. According to one example, the second canister contains a honeycombed material to adsorb fuel vapor, and present a higher flow restriction than the canister 114. In other examples, the second canister 134 contains a monolithic element, or another structure for adsorption of fuel vapor with a complex air flow path and presents a high restriction to flow therethrough. The monolithic or honeycombed material of the secondary canister 134 presents a higher flow restriction or pressure drop in comparison to the pellets contained within the canister 114.

During fueling of the fuel tank 112, increasing liquid fuel into the tank 112 displaces vapor within the tank volume. This displaced vapor may be adsorbed by the canister 114 and/or the secondary canister 134. Additionally, during diurnal cycles while the vehicle is inoperative, fuel vapors may be adsorbed by the canister 114 and/or the secondary canister 134. Likewise, for running losses. Once canister(s) 114, 134 are loaded with fuel vapors, the canisters 114, 134 may be emptied using a purge process while the engine 102 is operating. The CPV 132 is opened and the engine 102 running manifold vacuum in the air intake 108 is used to draw fuel vapor out from the canister and into the engine 102 in a process known as purging.

During refueling, the secondary canister 134 or filter may impede or restrict a fueling operation as it increases the back pressure within the canister 114 and also within the fuel tank 112. The increased back pressure within the tank 112 may cause an interruption in the fueling process, for example, if the pressure increases to the point that an automatic cutoff switch causes the dispensing device, e.g. a fuel pump, to stop pumping fuel into the fuel tank 112. In one example, flash of the fuel in the fuel tank may cause the interruption. Fuel flash may be affected by a temperature delta between the in-ground liquid fuel storage and the skin or walls of the fuel tank 112. Also, the fuel Reid vapor pressure (RVP) or volatility affects flash, with higher RVPs causing higher pressures within the fuel tank 112.

A filter assembly 180 is provided to selectively couple and decouple the second canister 134 with the canister 114. The assembly 180 may physically move the second canister 134 relative to the canister 114. The assembly 180 is described in further detail below with reference to FIGS. 2-6. The assembly 180 may be actuated in response to a fueling operation to decouple the secondary canister 134 or filter 134 from the canister 114 such that the canister 114 directly vents into atmosphere, and the secondary canister 134 with the high flow restriction is removed from the flow path thereby reducing back pressure in the canister 134 and fuel tank 112. The assembly 180 may then be actuated in response to the fueling process being completed to couple the secondary canister 134 to the canister 114 such that the canister 114 is in fluid communication with atmosphere via the secondary canister 134 and vent 131.

Figure 2:
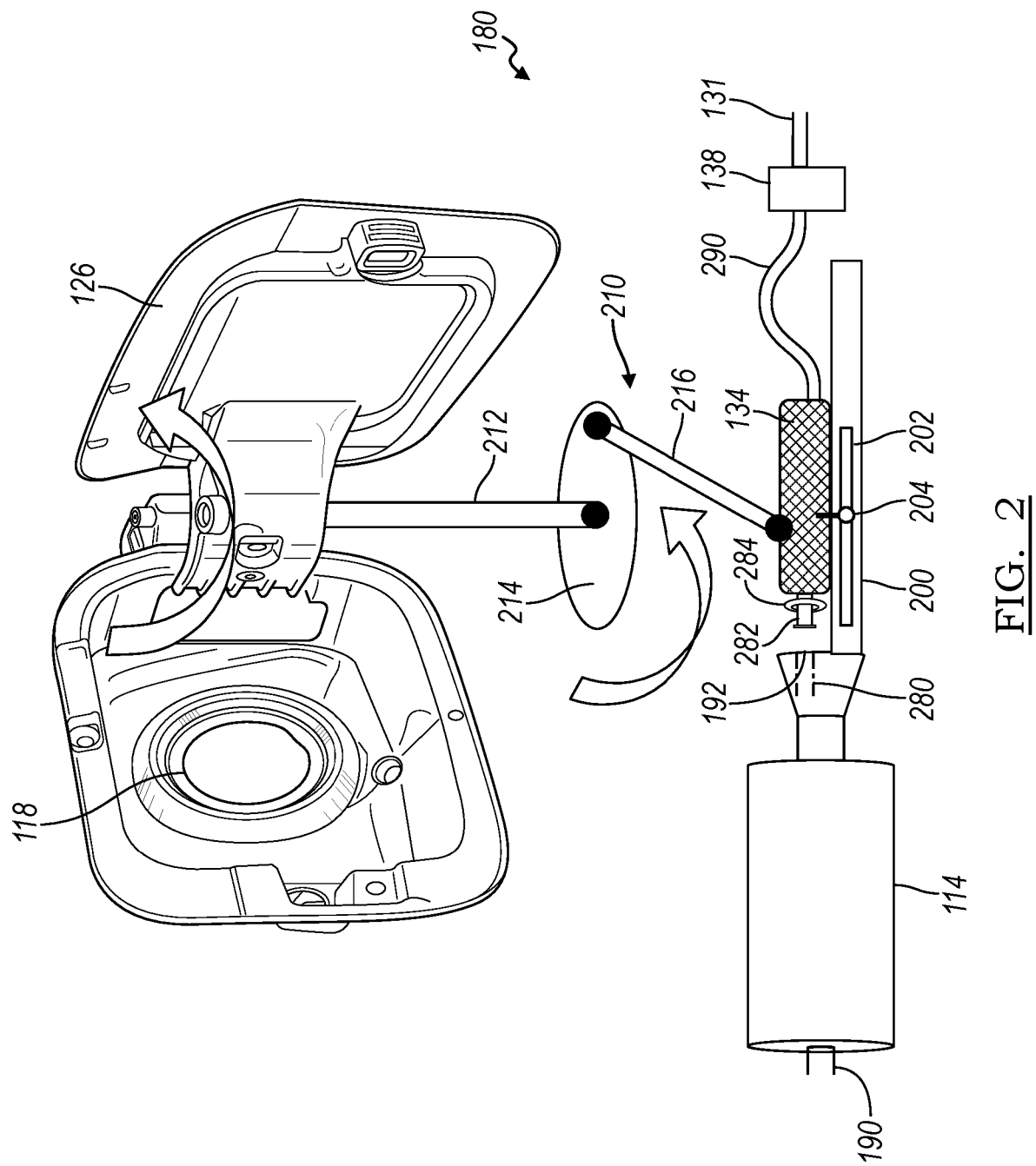
FIG. 2 illustrates a partial schematic view of an evaporative emission system according to an embodiment and for use with the fuel system of FIG. 1 in a first position.
Figure 3:
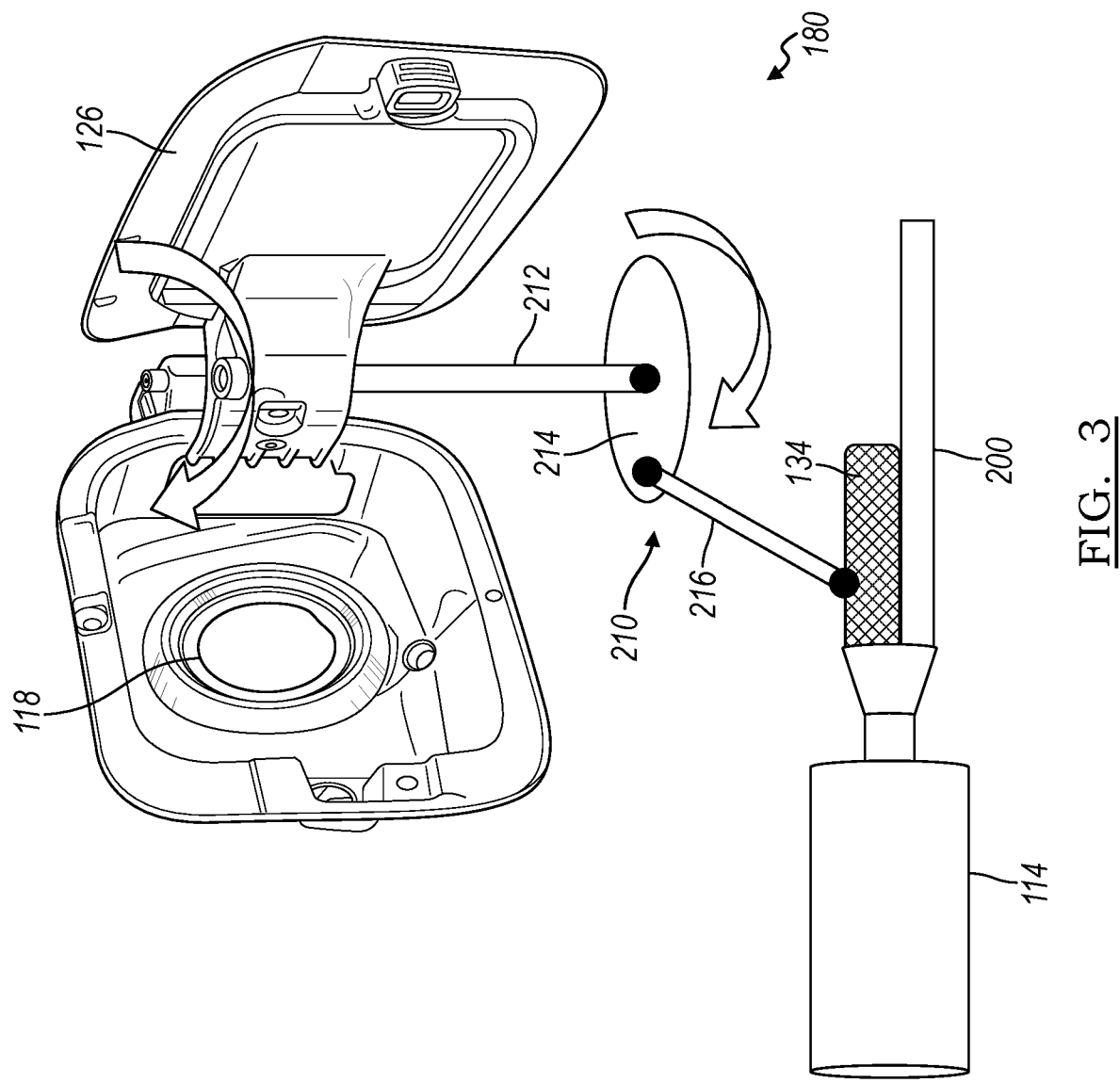
FIG. 3 illustrates a partial schematic view of the evaporative emission system of FIG. 2 in a second position.

FIGS. 2-3 illustrate schematic views of the assembly 180 and a portion of the evaporative emissions system 104. FIG. 2 illustrates the secondary canister 134 in a first position or decoupled position. FIG. 3 illustrates the secondary canister 134 in a second or coupled position. As shown by FIGS. 2-3, the assembly 180 physically moves or translates the secondary canister 134 relative to the canister 114 and between the first and second positions. Elements that are the same as or similar to those described above with reference to FIG. 1 have the same reference numbers for simplicity.

As shown in FIGS. 2-3, the canister 114 has a first port 190 and a second port 192. The first port 190 is fluidly coupled to the fuel tank 112 to receive vapor therefrom. The second port 192 is configured to connect to the second canister 134. The canister 134 is therefore positioned between an air intake for an engine and a vent 131 to atmosphere as described above.

The assembly 180 has a bracket 200. The bracket 200 supports the second canister 134 for movement or translation between the first and second positions. The bracket 200 may be connected to a vehicle frame member, the chassis, or another support element of the vehicle. In one example, the bracket 200 supports the second canister 134 for linear translation between the first and second positions as shown. In a further example, the second canister 134 is constrained for linear translation only relative to the bracket 200 and in a single degree of freedom.

The second canister 134 fluidly couples the second port 192 of the canister 114 to the vent 131 in the first position, and the second canister 134 is spaced apart from and decoupled from the second port 192 of the canister in the second position. The second port 192 of the canister 114 is in direct fluid communication with atmosphere as shown in FIG. 2 when the second canister 134 is in the second position. In one example, direct fluid communication means that there are no filters or canisters in the flow path between the port or element and atmosphere. In a further example, direct fluid communication means that there are no filters, canisters, valves, or other similar elements between the port and atmosphere; however, elements such as a tubing section, a tubing junction, or the like may be present. The second port 192 of the canister is in fluid communication with atmosphere via the second canister 134 and vent 131 when the second canister 134 is in the first position as shown in FIG. 3.

The canister 114 may additionally be supported by and connected to the bracket 200. In one example, the canister 114 is mounted to the bracket 200 such that the canister 134 does not move relative to the bracket 200.

According to one example, the bracket 200 defines a guide 202 with a first end and a second end. The guide 202 may be a track, a slot, or the like. The second canister 134 has a guide member 204 connected to it and extending therefrom. The guide member 204 is engaged with the guide 202 to control movement of the second canister 134 relative to the canister 114 and bracket 200. The guide member 204 may additionally cooperate with the guide 202 to prevent the second canister 134 from lifting or otherwise moving relative to the bracket 200, and maintain the second canister 134 along a path defined by the guide between the first and second positions.

In one example, and as shown, the assembly 180 has at least one linkage 210 that connects the closure member 126 to the second canister 134 to control the position of the second canister 134.

In the example shown in FIGS. 2-3, the assembly 180 include a shaft 212 that is connected to the closure member 126. The shaft 212 rotates as the closure member 126 rotates on its hinge. The shaft 212 is therefore mechanically coupled to the closure member 126 for rotation therewith. The shaft 212 is connected to and drives a disc 214. At least one linkage 216 is connected to the disc 214 and also connected to the second canister 134. As the disc 214 rotates with the shaft 212, the linkage 216 converts rotational motion to linear motion to move the second canister 134 between the first position and the second position. In a further example, the disc 214 and linkage 216 may be provided by a pinion and rack, respectively.

Movement of the closure member 126, or door, from the closed position to the open position rotates the shaft 212 to drive the at least one linkage 216 to move the second canister 134 from the first position to the second position. Movement of the closure member 126 from the open position to the closed position rotates the shaft 212 to drive the at least one linkage 216 to move the second canister 134 from the second position to the first position.

Figure 4:
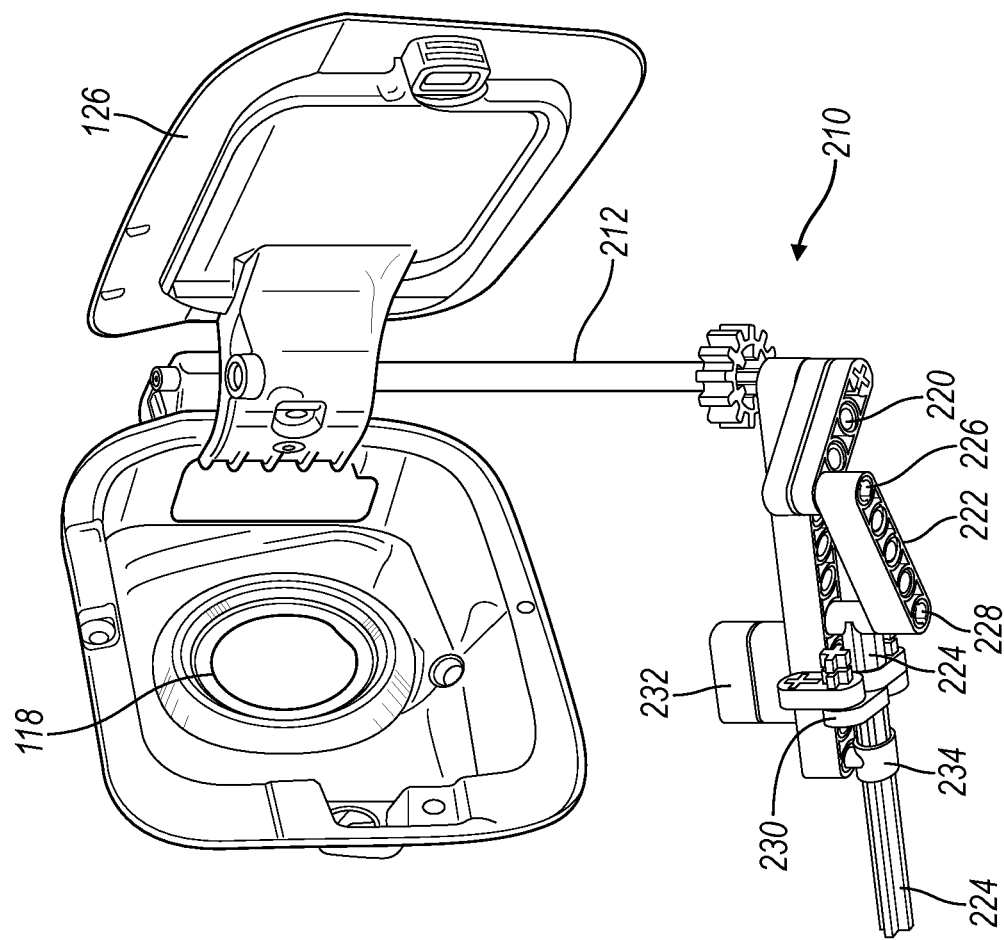
FIG. 4 illustrates a partial schematic view of an evaporative emission system for use with the fuel system of FIG. 1 according to a further embodiment.

In a further example, and as shown in FIG. 4, the at least one linkage 210 includes a first linkage 220, a second linkage 222, and a third linkage 224 that are rotatably connected to one another. The second canister 134 is connected to a mount 232 on a sliding bracket 230 on the bracket 200, with the sliding bracket 230 acting as the guide member, and the structure of the bracket 200 itself acting as the guide. The first linkage 220 has a first end region that is connected for rotation with the shaft 212. The second end region of the first linkage 220 is rotatably connected to the first end region of the second linkage 222, for example, using a pin 226. The second end region of the second linkage 222 is connected to the third linkage 224 via another pin 228. The third linkage 224 extends through a guide slot 234 defined by the bracket 200, and translates linearly relative to the bracket 200. The third linkage 224 is connected and fixed relative to the sliding bracket 230 such that the sliding bracket 230 and mount 232 for the second canister move with the third linkage 224. As the shaft 212 rotates, the first, second, and third linkages 220, 222, 224 move, and the sliding bracket 230 translates relative to the bracket 200. The third linkage 224 and guide slot 234 control the location of the second canister, and define the path of travel between the first and second positions.

Figure 5:
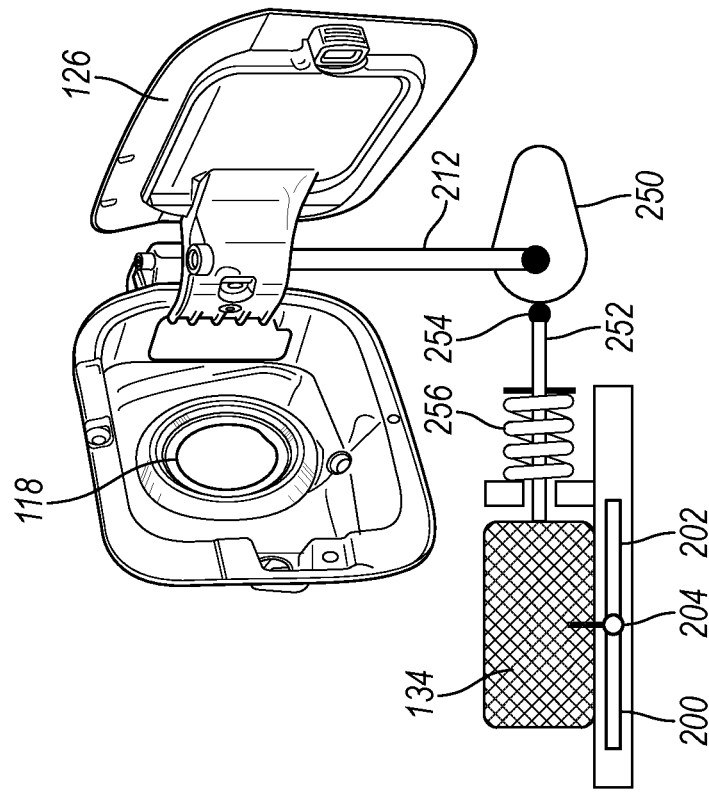
FIG. 5 illustrates a partial schematic view of an evaporative emissions for use with the fuel system of FIG. 1 according to another further embodiment.

In a further example, and as shown schematically in FIG. 5, the shaft 212 is connected to a cam 250 that rotates with the shaft. Additional gearing or other elements coupling the shaft 212 to the cam 250 may additionally be provided. A linkage 252 is coupled to the second canister, and has a follower 254 in contact with the surface of the cam 250. A biasing member 256, such as a spring, may additionally be provided to bias the follower 254 towards the cam 250.

Figure 6:
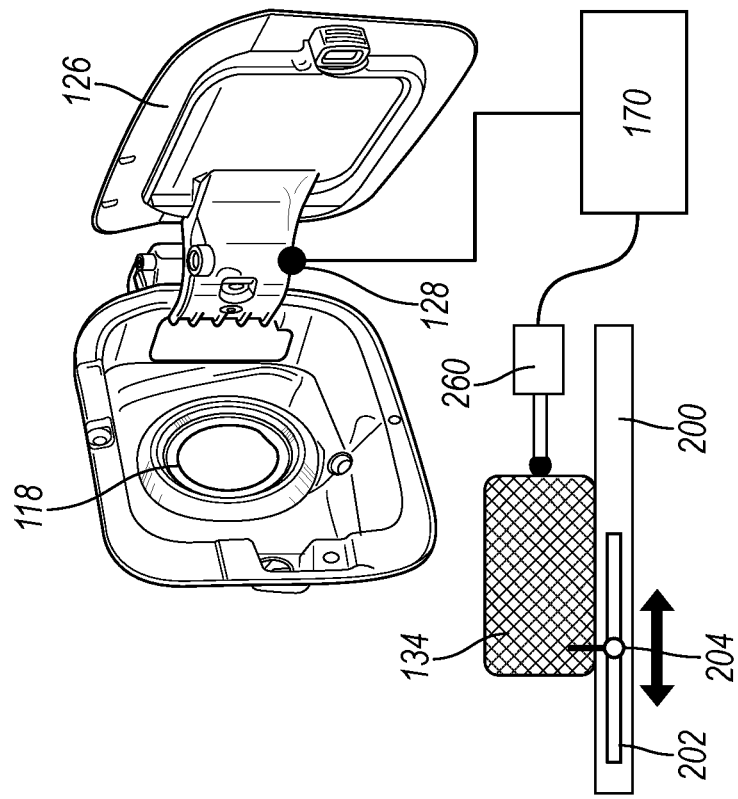
FIG. 6 illustrates a partial schematic view of an evaporative emissions for use with the fuel system of FIG. 1 according to a further embodiment.

In further examples, and as shown in FIG. 6, the assembly 180 may include a solenoid or other linear actuator 260 that is connected to the second canister 134 and also supported by the bracket 200. The linear actuator 260 may be electronically controlled by the controller 170 to move the second canister 134 to the first position or the second position in response to receiving a signal from the controller 170. The controller 170 may control the actuator 260 to one of the two positions based on a signal from a sensor 128 associated with the closure member 126.

Referring back to FIG. 2, and for use with the systems as described above with respect to FIGS. 1-6, the canister 114 has a first fitting 280 defining the second port 192. The first fitting 280 defines a first cylindrical mating surface. Although the first cylindrical mating surface is shown as a female fitting, it is also contemplated that a male fitting may be used as fitting 280. The second canister 134 has a second fitting 282 defining a second cylindrical mating surface to mate with the first cylindrical mating surface when the second canister 134 is in the coupled position of FIG. 3. Although the first cylindrical mating surface is shown as a female fitting, it is also contemplated that a male fitting may be used as fitting 280 and a female fitting as fitting 282. A sealing member 284 is supported by one of the first and second fittings, with the sealing member 284 positioned between the first and second cylindrical mating surfaces when the second canister 134 is in the coupled position.

For an evaporative emissions system with a CVS 138, the CVS 138 is positioned between and fluidly connects the second canister 134 to the atmospheric vent 131. The CVS 138 may be mounted on the vehicle structure, and therefore, the second canister 134 moves relative to the CVS 138. In various examples, the second canister 134 is therefore connected to the CVS 138 via a flexible hose 290 or tube, such as a polyurethane or vinyl tubing, braided hose, or the like.

In other examples, and when the evaporative emissions system 104 is provided without a CVS 138, the second canister 134 itself may define the atmospheric vent, or a flexible hose 290 may be provided between the second canister 134 and an additional filter element such as filter 136.

A method of controlling an evaporative emissions system 104 and fuel system 100, such as the evaporative emission and fuel systems of FIGS. 1-6 is also provided.

The second canister 134 or filter is decoupled from a port 192 of an evaporative emissions canister 114 in response to opening a closure member 126 for a fuel fill port 118 of a fuel tank when fueling the fuel tank such that the port 192 is in direct fluid communication with atmosphere.

The second canister 134 or filter is coupled to the port 192 of the evaporative emissions canister 114 in response to closing the closure member 126 to cover the fuel fill port such that the canister 114 is in fluid communication with atmosphere via the second canister 134.

The assembly 180 as described above is used to couple or decouple the second canister 134 to the canister 114. According to one example, at least one linkage 210 is driven via the closure member 126 to move the second canister 134 or filter towards the port 194 to couple it to the evaporative emissions canister 114, and to move the second canister 134 or filter away from the port 192 to decouple it from the evaporative emissions canister 114. According to another example, in response to the controller 170 receiving a sensor 128 signal indicative of a position of the closure member 126, the controller 170 controls an actuator 260 to couple the second canister 134 or filter to the evaporative emissions canister 114, and to decouple the second canister 134 or filter from the evaporative emissions canister 114.

The method also may be used to confirm that the second canister 134 is coupled to the canister 114 before beginning a purging operation for the canister(s), or before beginning other diagnostic tests for the evaporative emission system 104. If the second canister 134 is not coupled to the canister 114 during purging, unfiltered atmospheric air may be drawn into the evaporative emissions system 104 during a purge process. The controller 170 receives a signal indicative of the closure member 126 being in the closed position such that the second canister 134 is coupled to the canister 114. The signal may be from the sensor 128 or limit switch associated with the fuel fill port and closure member 126. The controller 170 may then control and open the CPV 132 to fluidly connect the canister 114 to the air intake 108 of an engine in response to receiving the signal and receiving a command for purging the canister(s) while the engine 102 is operating.

Furthermore, the controller 170 may determine the status of the sensor 128 and that the sensor is providing an accurate signal indicative of the state of the closure member 126. The controller 170 may first determine that the signal of the sensor 128 is indicative of the second canister 134 being coupled to the canister 114, and then proceed with any requested purge or diagnostic processes.

If the signal of the sensor 128 is indicative of the second canister 134 being decoupled from the canister 114, the controller 170 may perform diagnostics for state of the canister 134 and the sensor 128 itself to confirm that the second canister 134 is in fact coupled to the canister 114. The controller 170 first commands the CVS 138 to a closed position, then draws a vacuum on the evaporative emission system 104, with the vacuum level relative to atmospheric pressure. In one example, the target vacuum is −10 In—H2O (inches of water) within ten seconds. In other examples, other vacuum and/or time thresholds may be used. If the pressure in the evaporative emissions system 104 meets the target vacuum level within a predetermined time period, then the controller 170 determines that the second canister 134 is in fact coupled to the canister 114, and that the switch or sensor 128 signal is inaccurate. The controller 170 may then set a flag associated with the sensor 128. If the pressure in the evaporative emissions system 104 does not meet the target vacuum level within a predetermined time period, then the controller 170 determines that the second canister 134 is decoupled from the canister 114 such that the canister 114 is directly receiving atmospheric air which prevents the system 104 from meeting the target vacuum level, and that the switch or sensor 128 signal is accurate. The controller 170 may provide a notification to the user to close the closure member 126 as described below.

Finally, the controller 170 may monitor the status of the sensor 128 and closure member 126, and provide an alert or other notification to the user. The controller 170 may provide a notification to the user that the closure member 126 is open when the vehicle is started, for example, after a fueling event and to prevent the user from driving away from the fuel pump with an open door 126. The controller 170 may provide a notification to the user that the closure member 126 is open at vehicle key off, or when the vehicle is shut down such that the user may close the closure member 126 to couple the second canister 134 to the canister 114 prior to a cold soak event, and possible diurnal cycles on the evaporative emissions system 104. The controller 170 may provide a visual and or an audible alert to the user, either directly via the vehicle, or via a remote device, such as a personal mobile device, that is wirelessly connected to the vehicle.

While various embodiments are described above, it is not intended that these embodiments describe all possible forms of the disclosure or invention. Rather, the words used in the specification are words of description rather than limitation, and it is understood that various changes may be made without departing from the spirit and scope of the disclosure. Additionally, the features of various implementing embodiments may be combined to form further embodiments of the disclosure and invention.

What is claimed is:

1. A fuel system for a vehicle comprising:
   a fuel tank having a fuel fill port with a closure member;
   an evaporative emissions canister having a first port fluidly coupled to the fuel tank to receive vapor therefrom and a second port, the canister positioned between an air intake for an engine and a vent to atmosphere; and
   a filter supported by a bracket for movement between a first position and a second position, the filter fluidly coupling the second port of the canister to the vent in the first position, and the filter spaced apart from and decoupled from the second port of the canister in the second position;
   wherein the second port of the canister is in direct fluid communication with atmosphere when the filter is in the second position.

2. The system of claim 1 wherein the filter is supported for translation along the bracket between the first and second positions; and
   wherein the filter is connected via at least one linkage to the closure member.

3. The system of claim 1 wherein the filter is supported for linear translation along the bracket between the first and second positions; and
   wherein the filter is mechanically coupled to the closure member via a shaft and at least one linkage.

4. The system of claim 3 further comprising a cam positioned between the shaft and the at least one linkage.

5. The system of claim 3 wherein the closure member is a door rotatably supported relative to the fuel fill port, the closure member movable between a closed position to cover the fuel fill port and an open position for fueling the fuel tank via the fuel fill port.

6. The system of claim 5 wherein movement of the closure member from the closed position to the open position rotates the shaft to drive the at least one linkage to move the filter from the first position to the second position; and
   wherein movement of the closure member from the open position to the closed position rotates the shaft to drive the at least one linkage to move the filter from the second position to the first position.

7. The system of claim 1 wherein the filter is a second evaporative emissions canister.

8. The system of claim 7 wherein the second canister contains a honeycomb material.

9. The system of claim 8 wherein the canister contains pellets.

10. The system of claim 1 wherein the canister has a first fitting defining the second port, the first fitting defining a first cylindrical mating surface; and
    wherein the filter has a second fitting defining a second cylindrical mating surface to mate with the first cylindrical mating surface when the filter is in the first position.

11. The system of claim 10 further comprising a sealing member supported by one of the first and second fittings, the sealing member positioned between the first and second cylindrical mating surfaces when the filter is in the first position.

12. The system of claim 1 wherein the bracket defines a guide with a first end and a second end; and
    wherein the filter has a guide member engaged with the guide to control movement of the filter relative to the canister.

13. The system of claim 1 further comprising a canister vent valve (CVS) positioned between and fluidly connecting the filter to the vent, the canister vent valve connected to the filter via flexible hose.

14. A vehicle comprising:
    an engine having an air intake;
    a fuel tank with a fuel fill port and a closure member movable between a closed position to cover the fuel fill port and an open position to fuel the fuel tank via the fuel fill port;
    an evaporative emissions canister having a first port fluidly coupled to the fuel tank to receive vapor therefrom and a second port, the canister fluidly connecting the air intake to a vent to atmosphere;

a filter supported by a bracket for movement between a first position and a second position, the filter connected by at least one linkage to the closure member, the filter fluidly coupling the second port of the canister to the vent in the first position, and the filter spaced apart from and decoupled from the second port of the canister in the second position;

wherein the second port of the canister is in direct fluid communication with atmosphere when the filter is in the second position;

wherein movement of the closure member from the closed position to the open position drives the at least one linkage to move the filter from the first position to the second position; and wherein movement of the closure member from the open position to the closed position drives the at least one linkage to move the filter from the second position to the first position.

15. The vehicle of claim 14 further comprising a canister purge valve fluidly connecting the first port of the canister to the air intake of the engine; and a controller configured to open the canister purge valve in response to receiving a sensor signal indicative of the closure member being in a closed position and receiving a command for purging the canister while the engine is operating.

16. A method of controlling an evaporative emissions system for a vehicle, the method comprising:

decoupling a filter from a port of an evaporative emissions canister in response to opening a closure member for a fuel fill port of a fuel tank when fueling the fuel tank such that the port is in direct fluid communication with atmosphere; and coupling the filter to the port of the evaporative emissions canister in response to closing the closure member to cover the fuel fill port such that the canister is in fluid communication with atmosphere via the filter.

17. The method of claim 16 further comprising driving at least one linkage via the closure member to move the filter towards the port to couple the filter to the evaporative emissions canister, and to move the filter away from the port to decouple the filter from the evaporative emissions canister.

18. The method of claim 16 further comprising:

in response to receiving a sensor signal indicative of a closed position of the closure member, controlling an actuator to a first position to couple the filter to the evaporative emissions canister; and in response to receiving a sensor signal indicative of an open position of the closure member, controlling an actuator to a second position to decouple the filter from the evaporative emissions canister.

19. The method of claim 16 further comprising:

receiving a signal indicative of the closure member being in a closed position such that the filter is coupled to the closure member; and opening a canister purge valve fluidly connecting the canister to an air intake of an engine in response to receiving the signal and receiving a command for purging the canister while the engine is operating.

20. The method of claim 16 further comprising:

receiving a signal indicative of the closure member being in an open position from a sensor associated with the closure member;

closing a canister vent valve positioned between the filter and a vent to atmosphere and closing a canister purge valve positioned between the canister and an engine air intake;

drawing a vacuum on the canister; and in response to a pressure in the canister reaching a target pressure below atmospheric pressure within a predetermined time period, setting a flag associated with the sensor.

* * * * *